United States Patent [19]
Suda

[11] Patent Number: 6,087,804
[45] Date of Patent: Jul. 11, 2000

[54] ELECTRONIC APPARATUS USING THE POWER SUPPLY LINE OF A SERIAL BUS, FOR SUPPLYING AND PROVIDING POWER APPROPRIATELY

[75] Inventor: Junichiro Suda, Tokyo, Japan

[73] Assignee: Kabushiki Kaisha Toshiba, Kawasaki, Japan

[21] Appl. No.: 09/335,500

[22] Filed: Jun. 18, 1999

[30] Foreign Application Priority Data

Jun. 26, 1998 [JP] Japan ................................. 10-180499

[51] Int. Cl.$^7$ ..................................................... H02J 7/00
[52] U.S. Cl. ............................................................ 320/106
[58] Field of Search .................................. 320/106, 128, 320/137, 138

[56] References Cited

FOREIGN PATENT DOCUMENTS 9-331342  12/1997  Japan .
10-70561   3/1998  Japan .

*Primary Examiner*—Edward H. Tso
*Attorney, Agent, or Firm*—Finnegan, Henderson, Farabow, Garrett & Dunner, L.L.P.

[57] ABSTRACT

In an electronic apparatus comprising a power supply controller, a power supply circuit, a battery, and a host controller, when power is supplied to the apparatus through an AC power supply line, the power supply controller causes the power supply circuit to supply power to the main section and battery of the apparatus and to the power supply line of a serial bus. When no power is supplied to the apparatus through the AC power supply line and power is supplied to the apparatus through the power supply line of the serial bus, the power supply controller determines the amount of power to be consumed by the main section of the apparatus and the amount of power to charge battery with, from the amount of power represented by data supplied from the host controller, which represents the amount of power the power supply line of the serial bus can supply. The power supply controller controls the power supply circuit in accordance with the amount of power thus determined. When no power is supplied to the apparatus through the AC power supply line or the power supply line of the serial bus, the power supply controller controls the power supply circuit to supply power from the battery to the main section of the apparatus.

6 Claims, 4 Drawing Sheets

ELECTRONIC APPARATUS USING THE POWER SUPPLY LINE OF A SERIAL BUS, FOR SUPPLYING AND PROVIDING POWER APPROPRIATELY

BACKGROUND OF THE INVENTION

The present invention relates to an electronic apparatus which can be driven by a battery and to which a serial bus having a data line and a power supply line is connected if necessary.

In recent years, various electronic apparatuses that can be driven by a battery have been developed. Also, various electronic apparatuses that can receive data from other electronic apparatuses and can transmit data thereto have been developed.

In most electronic apparatuses of these types, the battery (secondary battery) is charged with the power supplied from a commercial power supply through an adapter designed for charging the battery.

Various types of interfaces are available for achieving data communication between electronic apparatuses. High-speed serial interfaces, such as IEEE1394, have been standardized in the computer industry. A serial interface is a serial bus that has a data line and a power-supply line. Not only can data be transferred through the data line, but also power can be supplied through the power supply line. Further, the data representing the amount of power that can be supplied or that has been requested can be supplied through the data line from one electronic apparatus to another.

In the conventional battery-driven electronic apparatus, the battery is charged by using the commercial power supply, as has been described above. Hence, the serial bus having a data line and a power supply line is used only as a data line for high-speed data transfer. The power supply line cannot be said to be utilized effectively.

BRIEF SUMMARY OF THE INVENTION

The object of the present invention is to provide an electronic apparatus which incorporates a battery and which uses the power supply line of a serial bus, for appropriately supplying and providing power to, for example, charge the battery.

To attain the object, the electronic apparatus according to this invention incorporates a battery and is connected to a serial bus having a power supply line. The apparatus detects whether any other electronic apparatus (including a charging adapter) capable of supplying power is connected to the serial bus. If the apparatus detects that any other electronic apparatus capable of supplying power is connected to the serial bus, the battery is charged with the power supplied from the other apparatus through the power supply line of the serial bus.

According to the present invention, an adapter, for example, designed to charge the battery, is used to supply power at the serial bus interface. Therefore, a connector for receiving power from the commercial power supply need not be provided in the electronic apparatus. The connector provided for receiving and transmitting data can serve to receive the power from the commercial power supply.

The electronic apparatus according to the invention comprises means for detecting whether power is supplied from an AC power supply line. If it is detected that any other electronic apparatus capable of supplying power is connected to the serial bus and that power is supplied from an AC power supply line, the battery will not be charged with the power supplied from the power supply line of the serial bus.

The electronic apparatus according to this invention determines the amount of power which the power supply line of the serial bus can supply, from the data on the data line of the serial bus. From the amount of power thus determined, the apparatus determines the amount of power with which the battery should be charged. The supply of power is thereby appropriately controlled in the electronic apparatus of this invention, in connection with the charging of the battery incorporated in the apparatus.

Further, the electronic apparatus according to the invention detects whether any other electronic apparatus which needs power is connected to the serial bus having a power supply line. If the apparatus detects that such another electronic apparatus is connected to the serial bus, power will be supplied from the battery to the power supply line.

The electronic apparatus according to this invention can supply power to any peripheral apparatus to which it supplies data and from which it receives data. This helps enhance the user friendliness of the system comprising the electronic apparatus and the peripheral apparatus.

Moreover, the electronic apparatus according to the invention can determine the amount of power any other electronic apparatus has requested, from the data on the data line of the serial bus. The amount of power thus determined is supplied from the battery to the power supply line. The supply of power is thereby appropriately controlled in the electronic apparatus of this invention with respect to the supply of power to the other electronic apparatus.

Furthermore, the electronic apparatus according to the present invention detects whether any other electronic apparatus that can supply power is connected to the serial bus having a power supply line. If the apparatus detects that such another apparatus is connected to the serial bus, the apparatus adjusts the amount of power which a main section of the electronic apparatus consumes. Thus, the electronic apparatus can continuously operate for a long time.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the invention will be described, with reference to the accompanying drawings.

Figure 1:
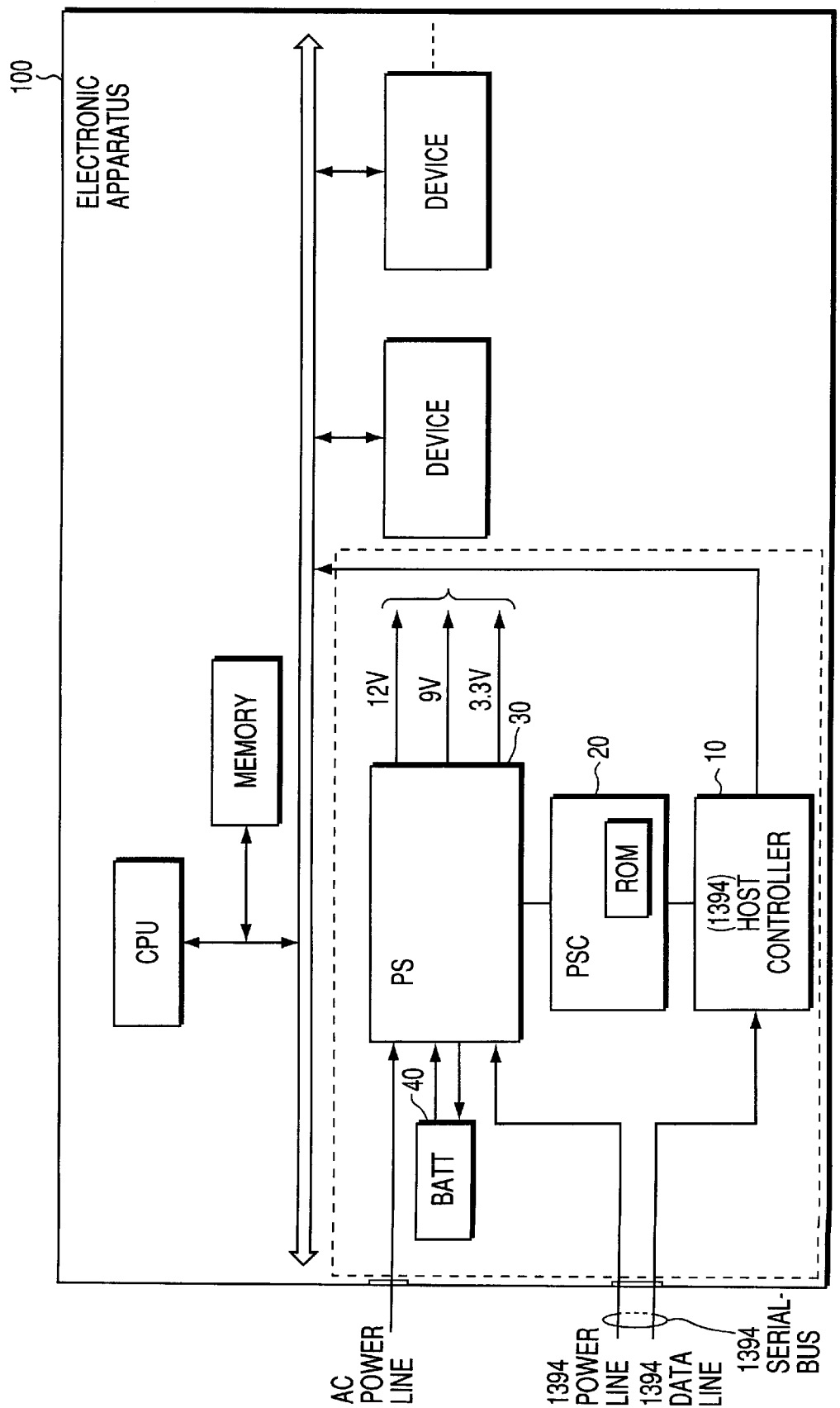
FIG. 1 is a diagram showing a part of an electronic apparatus which is an embodiment of the present invention.

FIG. 1 shows an electronic apparatus 100 which is an embodiment of the present invention. As shown in FIG. 1, the electronic apparatus 100 comprises a host controller 10, a power supply controller (PSC) 20, a power supply circuit (PS) 30, and a battery (BATT) 40. An AC power supply line and a serial bus of IEEE1394 standard, having a data line and a power supply line, are connected to the apparatus 100, if necessary.

The host controller 10 is connected to the data line of the serial bus, through which data communication is conducted between the electronic apparatus 100 and any other electronic apparatus. The host controller 10 detects whether or not power can be supplied to another electronic apparatus, if any connected to the serial bus, from the data on the data line of the serial bus. If power can be supplied to the other electronic apparatus, the host controller 10 determines the amount of power that can be supplied to the other apparatus, also from the data on the data line. The host controller 10 supplies to the power supply controller (PSC) 20 the data representing the amount of power thus determined, and the data showing that the other electronic apparatus is connected to the serial bus.

The power supply controller (PSC) 20 controls the a power supply circuit (PS) 30 so that the power for driving the electronic apparatus 100 may be controlled. The controller (PSC) 20 incorporates a ROM (Read Only Memory) 21 and executes firmware that operates in accordance with the program stored in the ROM 21. Further, the power supply controller (PSC) 20 can perform data communication with the host controller 10.

The power supply circuit (PS) 30 operates under the control of the control signal supplied from the power supply controller (PSC) 20. The AC power supply line, the battery (BATT) 40, and the power supply line of the serial bus are connected to the power supply circuit (PS) 30. The power supply circuit (PS) 30 receives power through the AC power supply line, from the battery (BATT) 40 or through the power supply line and generates three voltages of 12 V, 5 V and 3.3 V, which will drive the electronic apparatus 100. The power supply circuit (PS) 30 also charges the battery (BATT) 40 with the power supplied through the AC power line or the power supply line of the serial bus.

The battery (BATT) 40 is a secondary battery, or a rechargeable battery. It is connected to the power supply circuit (PS) 30 to supply power to the circuit 30 and to be charged with the power supplied from the circuit 30.

In the electronic apparatus 100 of the structure described above, the power-use priority is set as: AC power line>serial-bus power supply line>battery. If power is supplied to the apparatus 100 through the AC power line, the power supply controller (PSC) 20 causes the power supply circuit (PS) 30 to supply unconditionally the power to the main section of the apparatus 100, to the battery (BATT) 40, and to the power supply line of the serial bus. If power is supplied to the apparatus 100 through the power supply line of the serial bus, but not through the AC power line, the power supply controller (PSC) 20 determines the amount of power that driving the main section will consume and the amount of power for charging the battery 40. That is, the controller 20 determines these amount of power from the data supplied from the host controller 10 which represents the amount of power the power supply line of the serial bus can supply. On the basis of the amount of power thus determined, the power supply controller (PSC) 20 controls the power supply circuit (PS). If no power is supplied to the apparatus 100 through the AC power supply line or the power supply line of the serial bus, the power supply controller (PSC) 20 controls the power supply circuit (PS) 30 so that power is supplied from the battery (BATT) 40 to the main section of the electronic apparatus 100.

The electronic apparatus 100 according to the present embodiment is characterized in that the battery (BATT) 40 is charged, and the power supplied through the serial-bus power supply line is effectively used, on the basis of the data obtained through the serial-bus data line. The operating principle of this electronic apparatus 100 will be explained, with reference to FIGS. 2 to 4.

Figure 2:
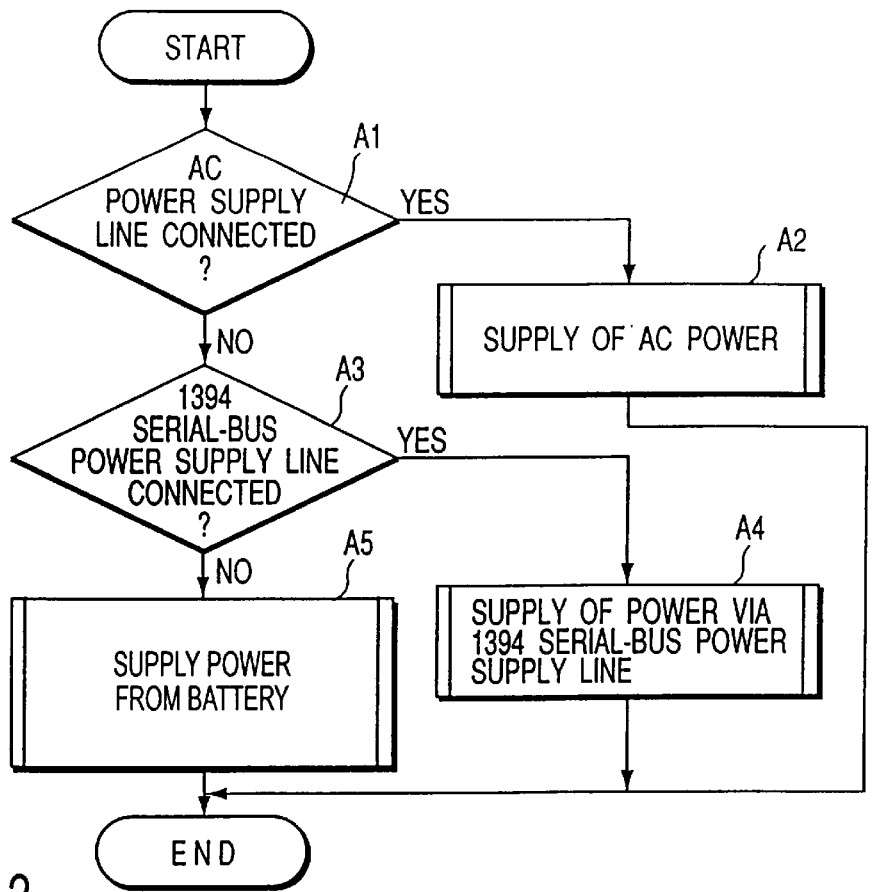
FIG. 2 is a flow chart explaining the sequence of operations performed in the embodiment shown in FIG. 1.

First, the power supply controller (PSC) 20 detects whether or not the AC power supply line is connected to the electronic apparatus 100 (Step A1 in FIG. 2). If an AC power line is connected to the apparatus 100 (if YES in Step A1), AC power is supplied to the apparatus 100 through the AC power line (Step A2 in FIG. 2), as will be described later with reference to FIG. 3.

If no AC power lines are connected to the apparatus 100 (if NO in Step A1), the power supply controller (PSC) 20 asks the electronic apparatus 100 whether or not the power supply line of the serial bus is connected to the apparatus 100 (Step A3 in FIG. 2). If the serial-bus power supply line is connected to the apparatus 100 (if YES in Step A3), power is supplied to the apparatus 100 via the serial-bus power supply line (Step A4 in FIG. 2), as will be described later with reference to FIG. 4.

If neither the AC power supply line nor the serial-bus power supply line is connected to the electronic apparatus 100 (if NO in Step A3), the power supply controller (PSC) 20 causes the power supply circuit (PS) 30 to supply power from the battery (BATT) 40 to the main section of the apparatus 100 (Step A5 in FIG. 2).

(Supply of AC Power)

Figure 3:
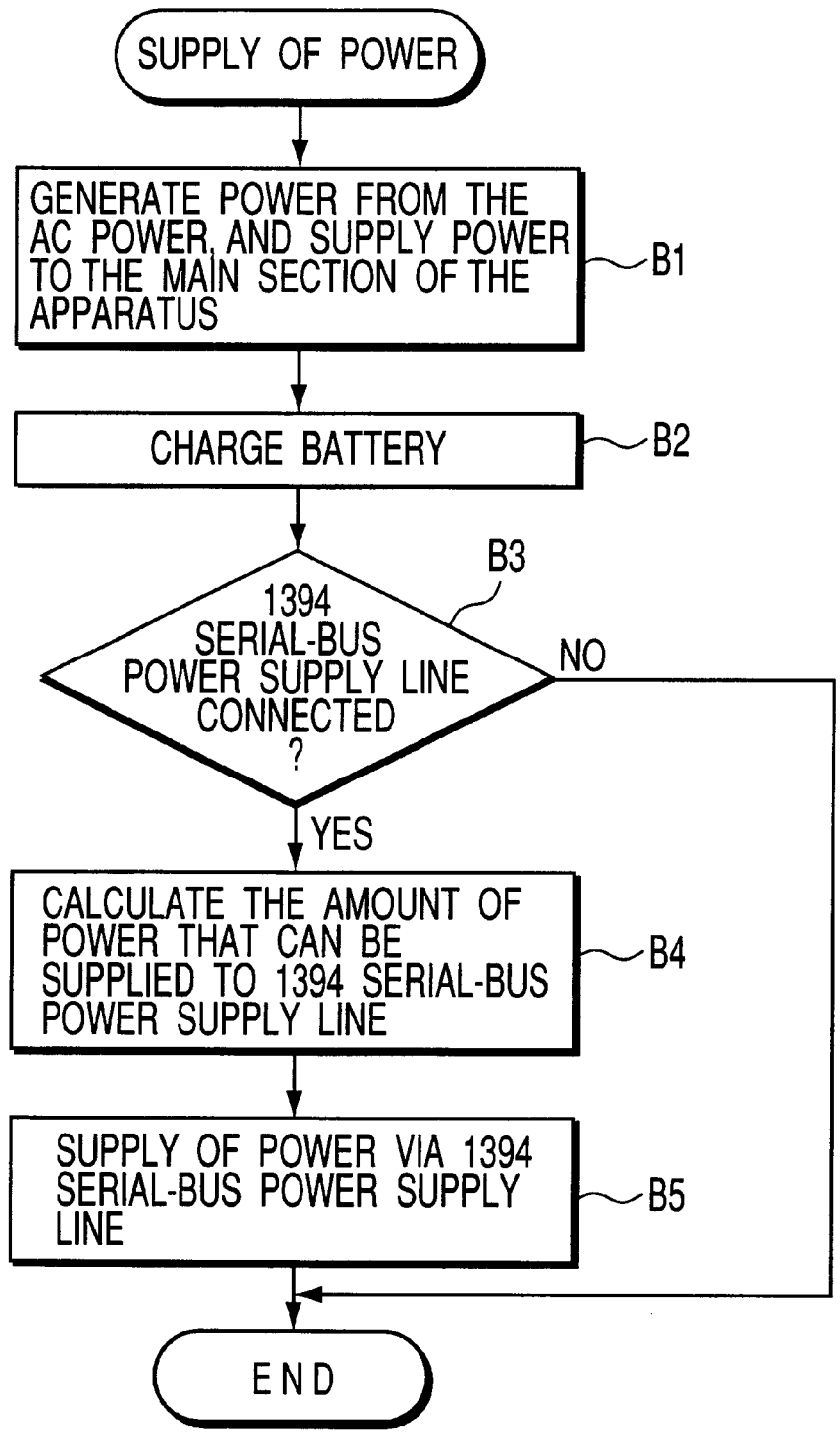
FIG. 3 is a flow chart explaining the sequence of supplying AC power, which is performed in the embodiment shown in FIG. 1.

In the case where the AC power supply line is connected to the electronic apparatus 100, the power supply controller (PSC) 20 causes the power supply circuit (PS) 30 to generate power from the power supplied through the AC power supply line and to output the power to the main section of the apparatus 100 (Step B1 in FIG. 3). Also, the controller 20 causes the circuit 30 to charge the battery (BATT) 40 with the power supplied through the AC power supply line (Step B2 in FIG. 3).

Next, the power supply controller (PSC) 20 asks the host controller 10 whether or not the serial-bus power supply line is connected to the electronic apparatus 100 (Step B3 in FIG. 3). If the serial-bus power supply line is connected to the apparatus 100 (if YES in Step B3), the controller 20 calculates the amount of power that can be supplied from the AC power line to the serial-bus power supply line via the power supply circuit (PS) 30, from the amount of power the main section of the apparatus 100 has consumed and the amount of power the circuit 30 has used to charge in the battery (BATT) 40 (Step B4 in FIG. 3). Then, the controller 20 makes the circuit 30 supply the power, thus calculated, to the serial-bus power supply line, and demand that the host controller 20 output to the serial-bus data line the data representing that amount of power (Step B5 in FIG. 3).

(Supply of Power via Serial-Bus Power Supply Line)

Figure 4:
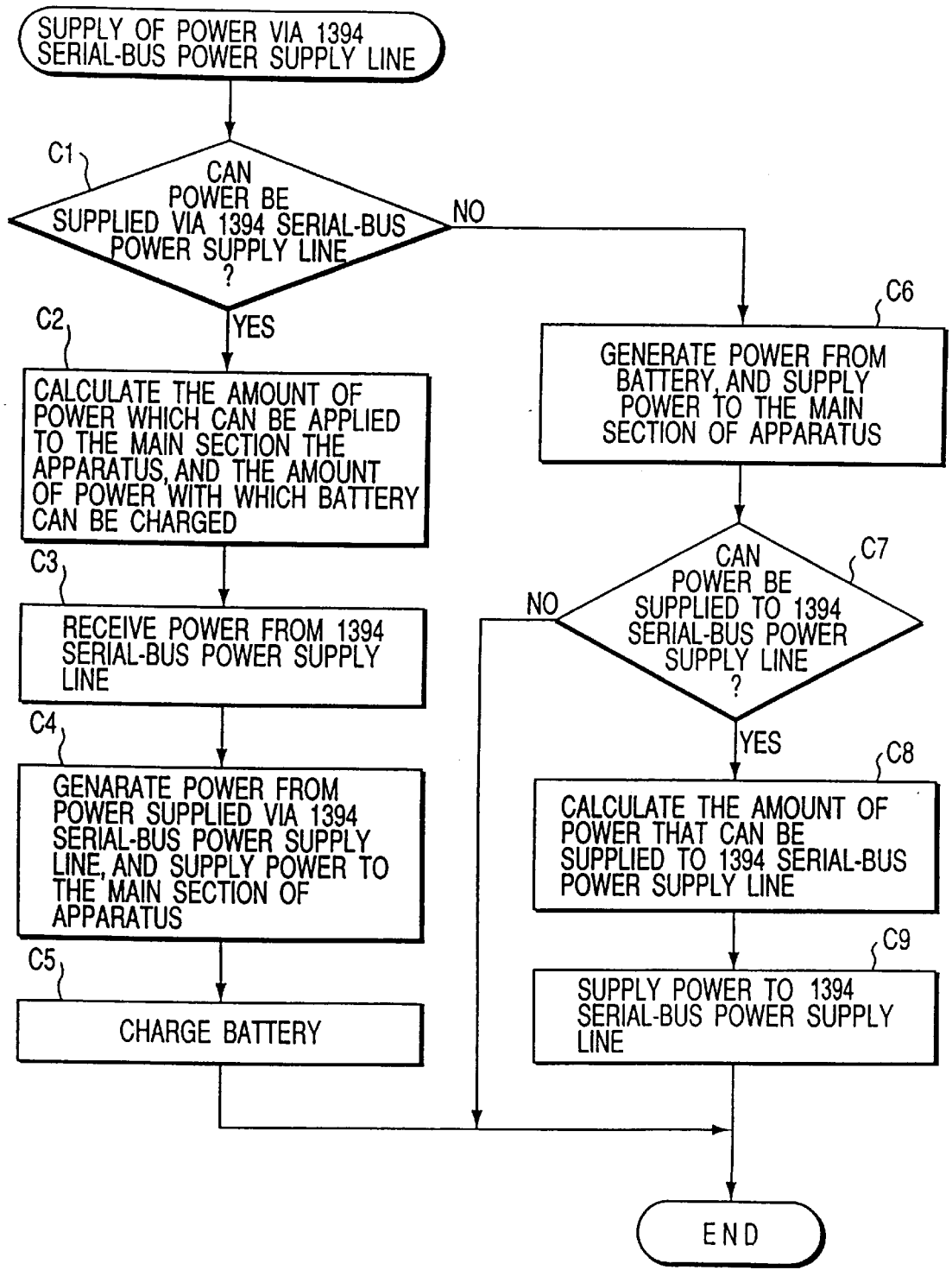
FIG. 4 a flow chart explaining the sequence of supplying power through the power supply line of the serial bus, which is effected in the embodiment shown in FIG. 1.

In the case where the AC power supply line is not connected to the electronic apparatus 100 and the serial-bus power supply line is connected to the apparatus 100, the power supply controller (PSC) 20 asks the host controller 10 whether or not the serial bus is connected to any other electronic apparatus that can supply power (Step C1 in FIG. 4). If the serial bus is connected to any other electronic apparatus (if YES in Step C1), the power supply controller (PSC) 20 determines the amount of power to be consumed by the main section of the apparatus 100 and the amount of power to charge the battery 40 with. More precisely, the controller 20 determines these amounts of power from the data supplied from the host controller 10 representing the amount of power that can be supplied from the other apparatus to the serial bus (Step C2 in FIG. 4). The controller 20 controls the power supply circuit (PS) 30 so that the circuit 30 receives the sum of these amounts of power from the serial-bus power supply line, and demands that the host controller 10 supply to the serial-bus data line the data representing this sum of the amounts of power (Step C3 in FIG. 4). The power the main section of the electronic apparatus 100 may be set by switching the operating mode (full-power mode or power-saving mode) of the electronic apparatus 100.

Then, the power supply controller (PSC) 20 causes the power supply circuit (PS) 30 to generate power for driving the main section of the apparatus 100 from the power supplied through the power supply line of the serial bus (Step C4 in FIG. 4). Further, the controller 20 makes the circuit 30 charge the battery (BATT) 40 with the power supplied through the serial-bus power supply line (Step C 5 in FIG. 4).

If the serial bus is not connected to any other electronic apparatus (if NO in Step C1), the power supply controller (PSC) 20 makes the power supply circuit (PS) 30 supply power from the battery (BATT) 40 to the main section of the electronic apparatus 100 (Step C6 in FIG. 4). Next, the controller 20 determines whether or not power can be supplied to the serial-bus power supply line, on the basis of the amount of power the battery 40 can supply and the amount of power the main section consumes (Step C7 in FIG. 4). If power can be supplied to the serial-bus power supply line (if YES in Step C7), the controller 20 calculates the amount of power that can be supplied to the serial-bus power supply line, from the amount of power the battery 40 can supply and the amount of power the main section consumes (Step C8 in FIG. 4). Then, the controller 20 controls the circuit 30, causing the circuit 30 to supply the amount of power, thus calculated, to the serial-bus power supply line and to demand that the host controller 10 supply to the serial-bus data line the data representing that amount of power (Step C9 in FIG. 4).

Figure 5A:
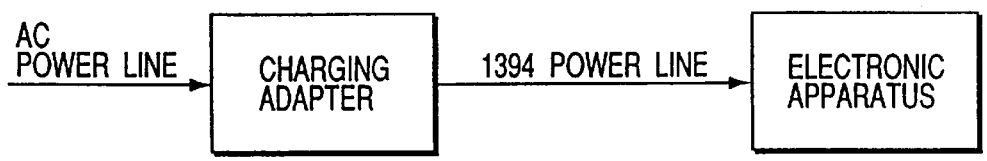
FIG. 5A is a diagram showing the electronic apparatus connected to an adapter for charging the battery incorporated in the apparatus.
Figure 5B:
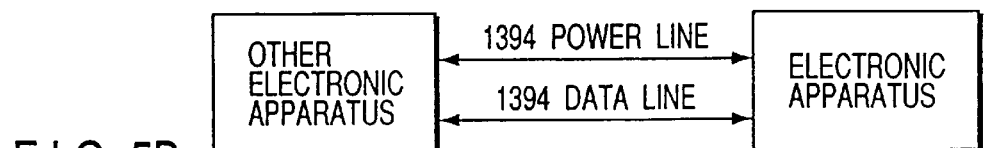
FIG. 5B is a diagram depicting the electronic apparatus connected to another electronic apparatus to receive data therefrom and transmit data thereto.
Figure 5C:
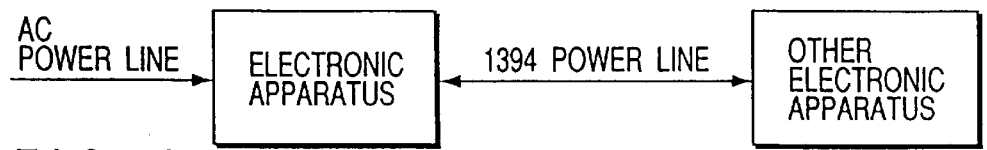
FIG. 5C is a diagram illustrating the electronic apparatus connected to another electronic apparatus to receive power therefrom and supply power thereto.

The serial-bus power supply line is used effectively as described above, whereby the same connector can connect the electronic apparatus 100 not only to an adapter designed for charging the battery as shown in FIG. 5A, but also to any other electronic apparatus as shown in FIG. 5B. Moreover, even if a connector is used, connecting the apparatus 100 to an AC power supply line as shown in FIG. 5C, the power supply can be controlled in accordance with various conditions, thereby to supply power from the apparatus 100 to any other electronic apparatus or to receive power from the other electronic apparatus.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:

1. An electronic apparatus which can be driven by a battery and to which a serial bus having a data line and a power supply line is connected when necessary, said apparatus comprising:

a serial bus controller connectable to the data line;

a power supply circuit connectable to the power supply line; and a power supply controller for performing data communication with the serial bus controller and for controlling the power supply circuit, wherein said serial bus controller comprises means for detecting whether any other electronic apparatus capable of supplying power is connected to the serial bus while the serial bus is connected to the electronic apparatus, and means for supplying the power supply controller with data indicating that another electronic apparatus is connected to the electronic apparatus, when it is detected that another electronic apparatus capable of supplying power is connected to the electronic apparatus; and said power supply controller comprises means for causing the power supply circuit to charge the battery with the power supplied through the power supply line, when the power supply controller receives the data indicating that another electronic apparatus is connected to the electronic apparatus.

2. An electronic apparatus which can be driven by a battery and to which an AC power supply line and a serial bus having a data line and a power supply line are connected when necessary, said apparatus comprising:

a serial bus controller connectable to the data line;

a power supply circuit connectable to the AC power supply line and the power supply line; and a power supply controller for performing data communication with the serial bus controller and for controlling the power supply circuit, wherein said serial bus controller comprises means for detecting whether any other electronic apparatus capable of supplying power is connected to the serial bus while the serial bus is connected to the electronic apparatus, and means for supplying the power supply controller with data indicating that another electronic apparatus is connected to the electronic apparatus, when it is detected that another electronic apparatus capable of supplying power is connected to the electronic apparatus; and said power supply controller comprises means for detecting whether power is being supplied from the AC power supply line, and means for causing the power supply circuit to charge the battery with the power supplied through the power supply line, when the power supply controller receives data indicating that another electronic apparatus is connected to the electronic apparatus, while it is detected that no power is being supplied from the AC power supply line.

3. An electronic apparatus which can be driven by a battery and to which a serial bus having a data line and a power supply line is connected when necessary, said apparatus comprising:

a serial bus controller connectable to the data line;

a power supply circuit connectable to the power supply line; and a power supply controller for performing data communication with the serial bus controller and for controlling the power supply circuit, wherein said serial bus controller comprises means for detecting whether any other electronic apparatus capable of supplying power is connected to the serial bus and for determining an amount of power that the other electronic apparatus is able to supply, while the serial bus is connected to the electronic apparatus, and means for supplying the power supply controller with data indicating that another electronic apparatus is connected to the electronic apparatus, together with data representing the amount of power determined, when it is detected that another electronic apparatus capable of supplying power is connected to the electronic apparatus; and said power supply controller comprises means for determining an amount of power with which the battery is to be charged, from the amount of power represented by the data, and means for causing the power supply circuit to charge the battery with the amount of power thus determined, supplied through the power supply line.

4. An electronic apparatus which can be driven by a battery and to which a serial bus having a data line and a power supply line is connected when necessary, said apparatus comprising:

a serial bus controller connectable to the data line;

a power supply circuit connectable to the power supply line; and a power supply controller for performing data communication with the serial bus controller and for controlling the power supply circuit, wherein said serial bus controller comprises means for detecting whether any other electronic apparatus requiring power from the serial bus is connected to the serial bus while the serial bus is connected to the electronic apparatus, and means for supplying the power supply controller with data indicating that another electronic apparatus is connected to the electronic apparatus, when it is detected that another electronic apparatus requiring power is connected to the electronic apparatus; and said power supply controller comprises means for causing the power supply circuit to supply power from the battery to the power supply line, upon receipt of the data indicating that the other electronic apparatus requiring power is connected to the electronic apparatus.

5. An electronic apparatus which can be driven by a battery and to which a serial bus having a data line and a power supply line is connected when necessary, said apparatus comprising:

a serial bus controller connectable to the data line;

a power supply circuit connectable to the power supply line; and a power supply controller for performing data communication with the serial bus controller and for controlling the power supply circuit, wherein said serial bus controller comprises means for detecting whether any other electronic apparatus requiring power from the serial bus is connected to the serial bus while the serial bus is connected to the electronic apparatus, and for detecting an amount of power that the other electronic apparatus requires, and means for supplying the power supply controller with data indicating that another electronic apparatus requiring power is connected to the electronic apparatus, together with data representing the amount of power detected, when it is detected that another electronic apparatus requiring power is connected to the electronic apparatus; and said power supply controller comprises means for determining an amount of power to be supplied from the battery to the power supply line, from the amount of power represented by the data supplied from the serial bus controller, and means for causing the power supply circuit to supply the amount of power, thus determined, from the battery to the power supply line.

6. An electronic apparatus which can be driven by a battery and to which a serial bus having a data line and a power supply line is connected when necessary, said apparatus comprising:

a serial bus controller connectable to the data line;

a power supply circuit connectable to the power supply line; and a power supply controller for performing data communication with the serial bus controller and for controlling the power supply circuit, wherein said serial bus controller comprises means for detecting whether any other electronic apparatus capable of supply power is connected to the serial bus and for determining an amount of power that the other electronic apparatus is able to supply, while the serial bus is connected to the electronic apparatus, and means for supplying the power supply controller with data indicating that another electronic apparatus is connected to the electronic apparatus, together with data representing the amount of power determined, when it is detected that another electronic apparatus capable of supplying power is connected to the electronic apparatus; and said power supply controller comprises means for adjusting an amount of power which a main section of the electronic apparatus consumes, in accordance with the amount of power represented by the data supplied from the serial bus controller.

* * * * *